US008270731B2

(12) United States Patent
Wang et al.

(10) Patent No.: US 8,270,731 B2
(45) Date of Patent: Sep. 18, 2012

(54) IMAGE CLASSIFICATION USING RANGE INFORMATION

(75) Inventors: Sen Wang, Rchester, NY (US); Jie Yu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 619 days.

(21) Appl. No.: 12/543,684

(22) Filed: Aug. 19, 2009

(65) Prior Publication Data

US 2011/0044530 A1 Feb. 24, 2011

(51) Int. Cl.
*G06K 9/00* (2006.01)

(52) U.S. Cl. ..................................... 382/224

(58) Field of Classification Search .................. None
See application file for complete search history.

(56) References Cited

U.S. PATENT DOCUMENTS

| | | | |
|---|---|---|---|
| 6,252,976 B1 | 6/2001 | Schildkraut et al. | |
| 6,873,743 B2 | 3/2005 | Steinberg | |
| 6,915,011 B2 | 7/2005 | Loui et al. | |
| 7,230,538 B2 | 6/2007 | Lai et al. | |
| 7,421,149 B2 | 9/2008 | Haynes et al. | |
| 7,421,418 B2 | 9/2008 | Nakano | |
| 7,526,127 B2 | 4/2009 | Koide et al. | |
| 7,903,168 B2 * | 3/2011 | Pillman et al. | 348/345 |
| 8,126,219 B2 * | 2/2012 | Fukuda | 382/118 |
| 2002/0126893 A1 | 9/2002 | Held et al. | |
| 2003/0007687 A1 | 1/2003 | Nesterov et al. | |
| 2003/0044063 A1 | 3/2003 | Meckes et al. | |
| 2003/0044070 A1 | 3/2003 | Fuersich et al. | |
| 2003/0044178 A1 | 3/2003 | Oberhardt et al. | |
| 2003/0223622 A1 | 12/2003 | Simon et al. | |
| 2007/0121094 A1 | 5/2007 | Gallagher et al. | |
| 2009/0225155 A1 * | 9/2009 | Hirotani | 348/61 |
| 2012/0057745 A9 * | 3/2012 | Wang | 382/103 |

OTHER PUBLICATIONS

"Dominant Sets and Pairwise Clustering", by Massimiliano Pavan et al., IEEE Transactions on Pattern Analysis & Machine Intelligence, vol. 29, No. 1, Jan. 2007, pp. 167-172.

"Object Detection using a Max-Margin Hough Transform" by S. Maji et al., Prop. IEEE Conf. on Computer Vision and Pattern Recognition, 2009.

(Continued)

*Primary Examiner* — Vikkram Bali
(74) *Attorney, Agent, or Firm* — Kevin E. Spaulding

(57) ABSTRACT

A method of identifying an image classification for an input digital image comprising receiving an input digital image for a captured scene; receiving a range map which represents range information associated with the input digital image, wherein the range information represents distances between the captured scene and a known reference location; identifying the image classification using both the range map and the input digital image; and storing the image classification in association with the input digital image in a processor-accessible memory system.

15 Claims, 7 Drawing Sheets

OTHER PUBLICATIONS

"Object-Specific Figure-Ground Segregation" by S. X. Yu, et al., Proc. IEE Conf. on Computer Vision and Pattern Recognition, 2003.

"Object Segmentation Using Graph Cuts Based Active Contours" by N. Xu et al., Proc. IEEE Conf. on Computer Vision and Pattern Recognition, 2003.

"What, where and who? Classifying events by scene and object recognition" by Li-Jia Li, Dept. of Electrical and Computer Engineering, University of Illinois at Urbana-Champaign, USA, 97-1-4244-1631-8/07/ 2007IEEE.

"Support-Vector Networks", Corinna Cortes and Vladimir Vapnik, AT&T Bell labs, Holmdel, NY 07733, USA, 1995 Kluwer Academic publishers, Boston, Manufactured in The Netherlands, Machine Learning, 20, 273-297 (1995).

A Decision-Theoretic Generalication of On-Line Learning and an Application to Boosting, Yoav Freund and Robert E. Schapire, AT&T Labs, 180 Park Avenue, Florham Park, New Jersey 07932, Article No. SS 971504, Journal of computer and System Sciences 55, 119-139 (1977).

* cited by examiner

IMAGE CLASSIFICATION USING RANGE INFORMATION

CROSS-REFERENCE TO RELATED APPLICATIONS

Reference is made to commonly assigned, U.S. patent application Ser. No. 12/264,277, filed Nov. 4, 2008, entitled "Event Recognition Using Image and Location Information", by, J. Yu, et al., commonly assigned, co-pending U.S. patent application Ser. No. 12/510,431 tiled Jul. 28, 2009, entitled "Detection of Objects Using Range Information", by S. Wang, commonly assigned, U.S. patent application Ser. No. 12/511,111 filed Jul. 29, 2009, entitled "Adjusting Perspective and Disparity in Stereoscopic Image pairs", by S. Wang, commonly assigned, U.S. patent application Ser. No. 12/533,325 filed Jul. 31, 2009, entitled "Digital Image Brightness Adjustment Using Range Information", by S. Wang, and commonly assigned, U.S. patent application Ser. No. 12/539,139 filed Aug. 10, 2009, entitled "Determining Main Objects Using Range Information", by S. Wang, which are incorporated herein by reference.

FIELD OF THE INVENTION

This invention relates to the classification of digital images, and more particularly to a method to classify digital images using range information.

BACKGROUND OF THE INVENTION

Digital cameras have become widely accepted in the marketplace. Most users have a large number of digital images in their collections, often residing in unorganized folders on their home computer. Typically, the images are stored with meaningless names representing the frame number for the digital camera on which they were captured. A large frustration for many users is being able to find an image that they are looking for in their image collection, which may contain thousands of images. As a result, many images sit unused.

In order to enable easier retrieval of digital images stored in digital image collections, it is desirable to be able to classify pictorial images according to attributes such as event type, subject and the like. This is an important step to enable a more satisfying user experience for the viewing and use of digital images.

There is an extensive body of prior art addressing image classification methods. For example, L. J. Li and L. Fei-Fei have proposed a method to classify events in images by integrating scene and object categorizations in their published article, "What, Where and Who? Classifying Events by Scene and Object Recognition" (Proceedings of Eleventh IEEE International Conference on Computer Vision, pp. 1-8, 2007).

Another example of an image classification method would include U.S. Pat. No. 6,915,011 by A. Loui, et al. which describes an event clustering method using foreground and background segmentation.

One problem with the prior art methods is that it is often difficult to distinguish between objects which may have similar attributes. For example, a large red area in an image may correspond to a red shirt, a red barn or a sunset sky. One scene attribute that would make it easier to distinguish between different types of image content would be range information corresponding to the distance of objects in the scene from the viewpoint. Most digital images do not have range information available, although developing cameras that capture range information is an area of active research. But even when range information is available, it has not been used in any image classification methods. Consequently, a need exists in the art for an image classification using range information.

SUMMARY OF THE INVENTION

The present invention represents a method of identifying an image classification for an input digital image comprised of image pixels, comprising a digital image processor for performing the following:

a) receiving an input digital image for a captured scene;

b) receiving a range map which represents range information associated with the input digital image, wherein the range information represents distances between the captured scene and a known reference location;

c) identifying the image classification using both the range map and the input digital image; and d) storing the image classification in association with the input digital image in a processor-accessible memory system.

It is an advantage of the present invention that by using range information images can be classified with improved accuracy.

It is an additional advantage of the present invention that the use of range information in the image classification process makes it possible to distinguish between different elements of image content that may have very similar visual characteristics and would be difficult to distinguish using conventional image classifiers.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments;

however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
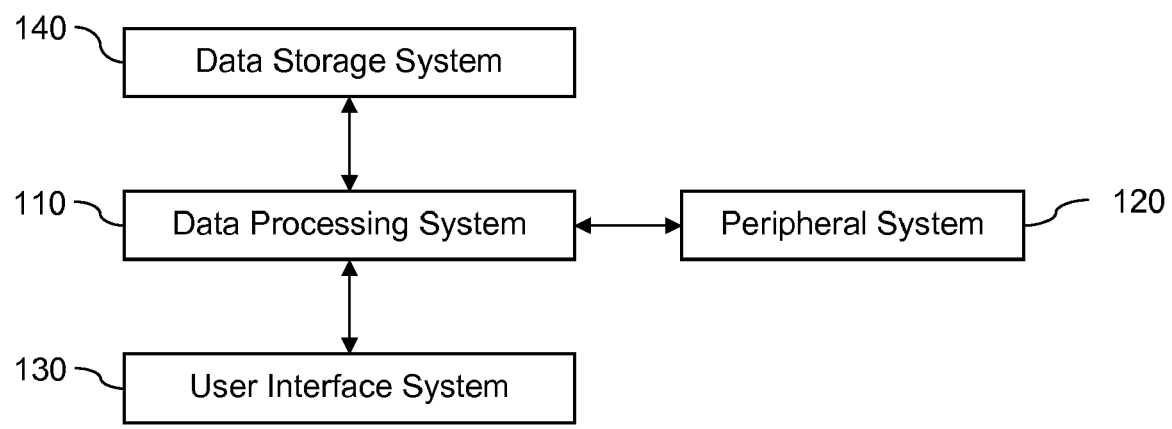
FIG. 1 is a high-level diagram showing the components of a system for classifying digital image according to an embodiment of the present invention.

FIG. 1 is a high-level diagram showing the components of a system for classifying digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-6 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-6 described herein. The data storage system 140 may be a distributed processor-accessible memory system including multiple processor-accessible memories communicatively connected to the data processing system 110 via a plurality of computers and/or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
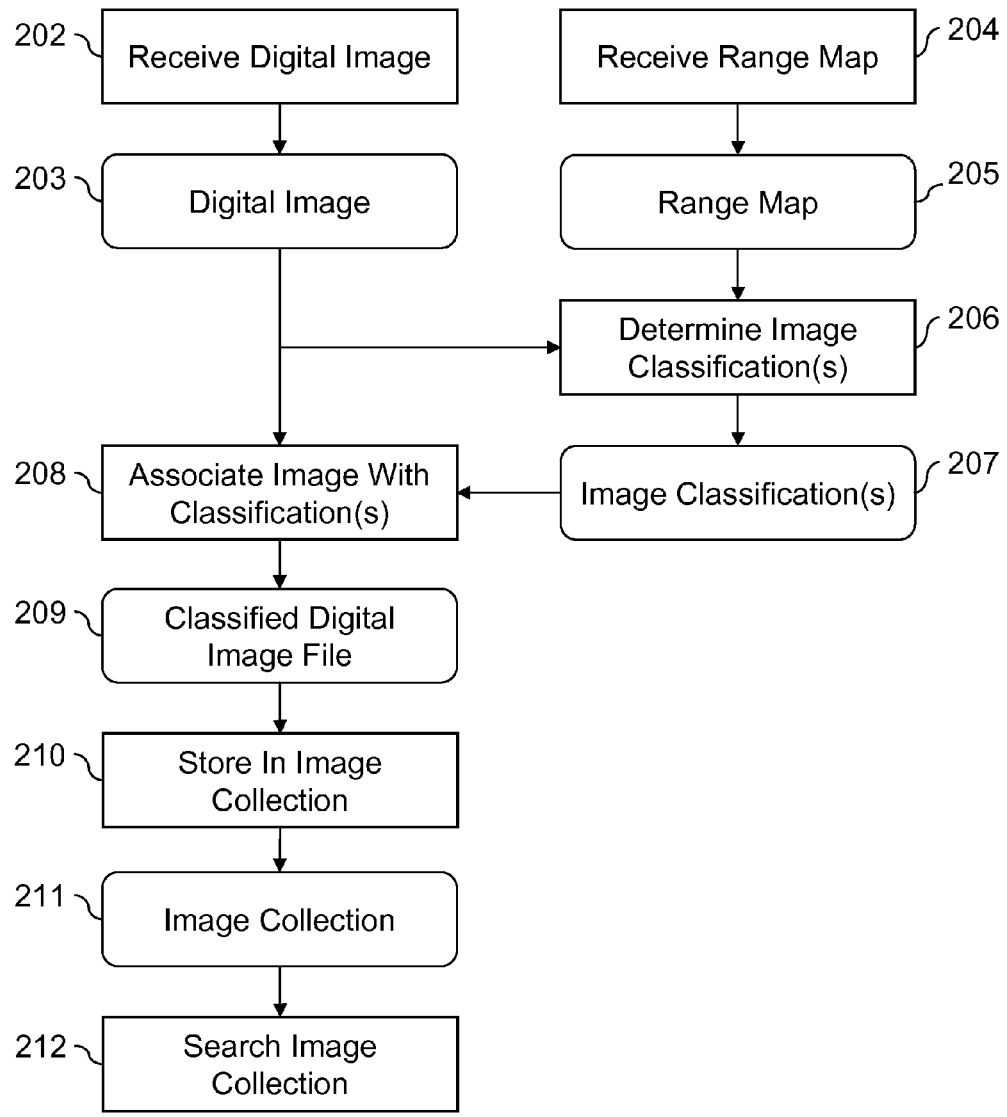
FIG. 2 is a flowchart illustrating a method for identifying an image classification for an input digital image according to an embodiment of the present invention.

FIG. 2 is a flow diagram illustrating a method for classifying digital images according to an embodiment of the present invention. A digital image 203 representing a scene is received in receive digital image step 202. The digital image 203 can be capture by a digital camera or a scanner. Alternately, it may be a frame of a video sequence captured by a video camera.

Range map 205 associated with the digital image 203 is received in receive range map step 204. The range map 205 includes distances of pixels in the scene from a known reference location. A viewpoint location should generally be identified relative to the given range information in the range map 205. Usually, the viewpoint location is the reference location. The range map 205 is preferably provided by a ranging camera which uses visible light, infrared light, laser light or ultrasound, to determine distances to pixels in the scene. Alternately, the range map can be provided using stereoscopic image processing techniques that involve capturing images of a scene from multiple viewpoints and determining the range information by evaluating the relative positions of objects in the scene. For cases where the range map has different dimensions (i.e., number of rows and columns) than the digital image 203, the range map 205 is preferably interpolated so that it has the same dimensions.

In identify image classification(s) step 206, one or more image classifications 207 are identified using both the range map 205 and the digital image 203. Typical examples of image classifications 207 would include birthday party, wedding, graduation, tennis games, golfing, beach activities, hiking, theme park visits, shopping, playground activities, city park activities, sunset, indoor scene and outdoor scene. In some cases, more than one image classification may properly be identified for a particular digital image 203. For example, an image of a birthday party in a city park would fall within the birthday party, city park activities and outdoor scene image classifications.

The identified image classification(s) 207 are associated with the digital image 203 and stored in a digital file in associate image with classification(s) step 208, forming a classified digital image file 209. The Classified digital image file 209 can then be stored in an image collection 211 using a store in image collection step 210. This enables a user to search the image collection 211 for digital images having a specific image classification using search image collection step 212.

Figure 3:
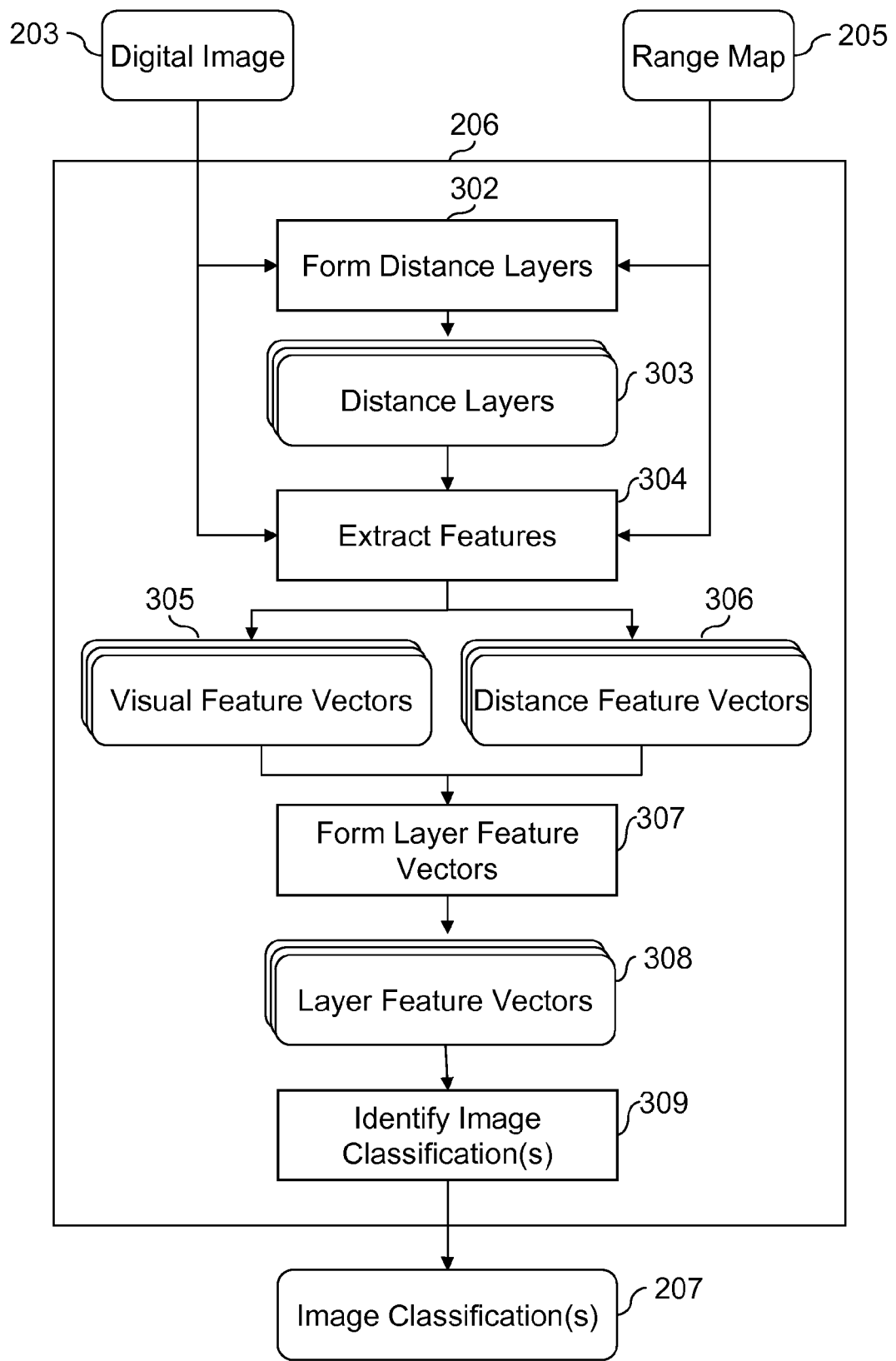
FIG. 3 is a flowchart illustrating additional details for the determine image classification step shown in FIG. 2.

FIG. 3 is a flowchart illustrating additional details for the determine image classification(s) step 206 shown in FIG. 2. The digital image 203 and the range map 205 are provided as inputs. In form distance layers step 302, pixels in the digital image 203 are grouped into distance layers 303 based on their distance from the viewpoint. In a preferred embodiment of the present invention, the distance layers are formed using a clustering algorithm such as a method described in the paper "Dominant Sets and Pairwise Clustering" (IEEE Transactions on Pattern Analysis & Machine Intelligence, Vol. 29, pp. 167-172, 2007). Each distance layer 303 is a subset of the image pixels in the digital image 203 representing points in the scene where the distance from the viewpoint falls within different range intervals. The range intervals can be predefined or can be determined by a distance clustering algorithm. It may be desirable to refine the distance layers to fill small holes and remove small cluster regions.

In extract features step 304, visual features are extracted from each of the distance layers 303. Visual features are parameters related to image attributes such the color, texture and shape of the image pixels contained in a distance layer 303. Examples of particular image features would include: color histogram, wavelet coefficients, GIST and SIFT features. Multiple visual features are generally identified for each layer and are collected into a visual feature vector 305 for each of the distance layers 303.

Distance features are also extracted for each of the distance layer to form distance feature vectors 306. In one embodiment of the present invention, the distance feature vector 306 for each distance layer 303 contains a single distance feature corresponding to the average distance of pixels in that distance layer 303 from the viewpoint. The average distance for the $k^{th}$ layer, $D_k$, can be calculated as follows:

$$D_k = \frac{1}{n} \sum_{i,j \in \text{object } k} d(i, j),$$

where $d(i, j)$ is the distance of the pixel in location $(i, j)$ and $n$ is the number of pixels in the $k^{th}$ distance layer. In a preferred embodiment of the present invention the average distance values are normalized by subtracting the average distance of the closest distance layer.

In another embodiment of the present invention, distance categories are defined corresponding to ranges of distances (e.g., "near," "middle" and "far"). In this case, the distance feature for each distance layer 303 would be the distance category. In yet another embodiment of the present invention, the distance feature vectors 306 for each distance layer 303 can include multiple distance features (e.g., average distance, standard deviation of distance and distance category).

In form layer feature vectors step 307, the visual feature vectors 305 and the distance feature vectors 306 are concatenated to form combined layer feature vectors 308 for each distance layer 303. The layer feature vectors 308 are then used in identify image classification step 308 to determine one or more image classification(s) 207 for the digital image 203.

There are many different image classifier algorithms that are well-known in the art that can be used in accordance with the present invention. Image classifier algorithms generally work by performing a training step to train the image classifier using a large number of images whose classifications are known. In the training step, a statistical model is determined that relates a feature vector to the corresponding image classification. The image classifier can then be applied to feature vectors determined for unknown input images to determine the highest probability image classification(s). Examples of state-of-the-art machine learning techniques that can be used for image classifier algorithms include the Support Vector Machine algorithm described by C. Cortes and V. Vapnik in the paper "Support-Vector Networks" (Machine Learning, Vol. 20, pp. 273-297, 1995) and the AdaBoost algorithm described by Y. Freund and R. Schapire in the paper "A decision-theoretic generalization of on-line learning and an application to boosting"(Journal of Computer and System Sciences, Vol. 55, pp. 119-139, 1997).

Figure 4:
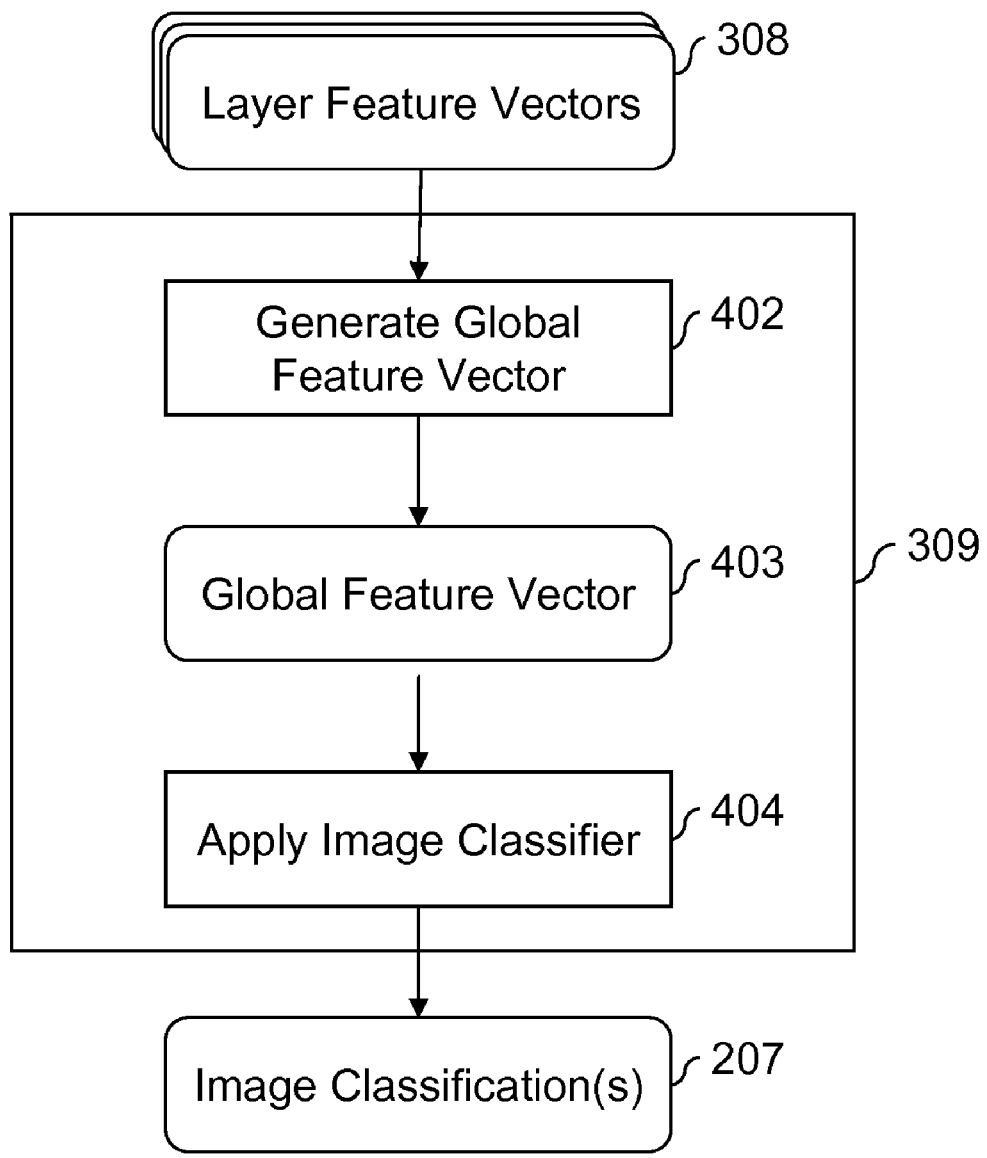
FIG. 4 is a flowchart illustrating additional details for a first embodiment of the identify image classification step shown in FIG. 3.

FIG. 4 is a flowchart illustrating additional details for the identify image classification(s) step 309 in FIG. 3, according to a first embodiment of the present invention. In generate global feature vector step 402 the layer feature vectors 308 for each of the distance layers are concatenated together to form a single global feature vector 403. The global feature vector 403 is fed to a trained classifier in apply classifier step 404 to determine the one or more image classifier(s) 207. For example, if the global feature vector 403 contains a distance layer where the distance feature is "far" and where the visual features indicate that it is red in color and has a low amount of texture, the trained classifier would indicate a high likelihood that the digital image was a sunset scene. On the other hand, if the distance feature is "near" the distance layer would be more likely to correspond to a red object such as a shirt and the trained classifier would indicate a low likelihood that the image is a sunset scene.

Figure 5:
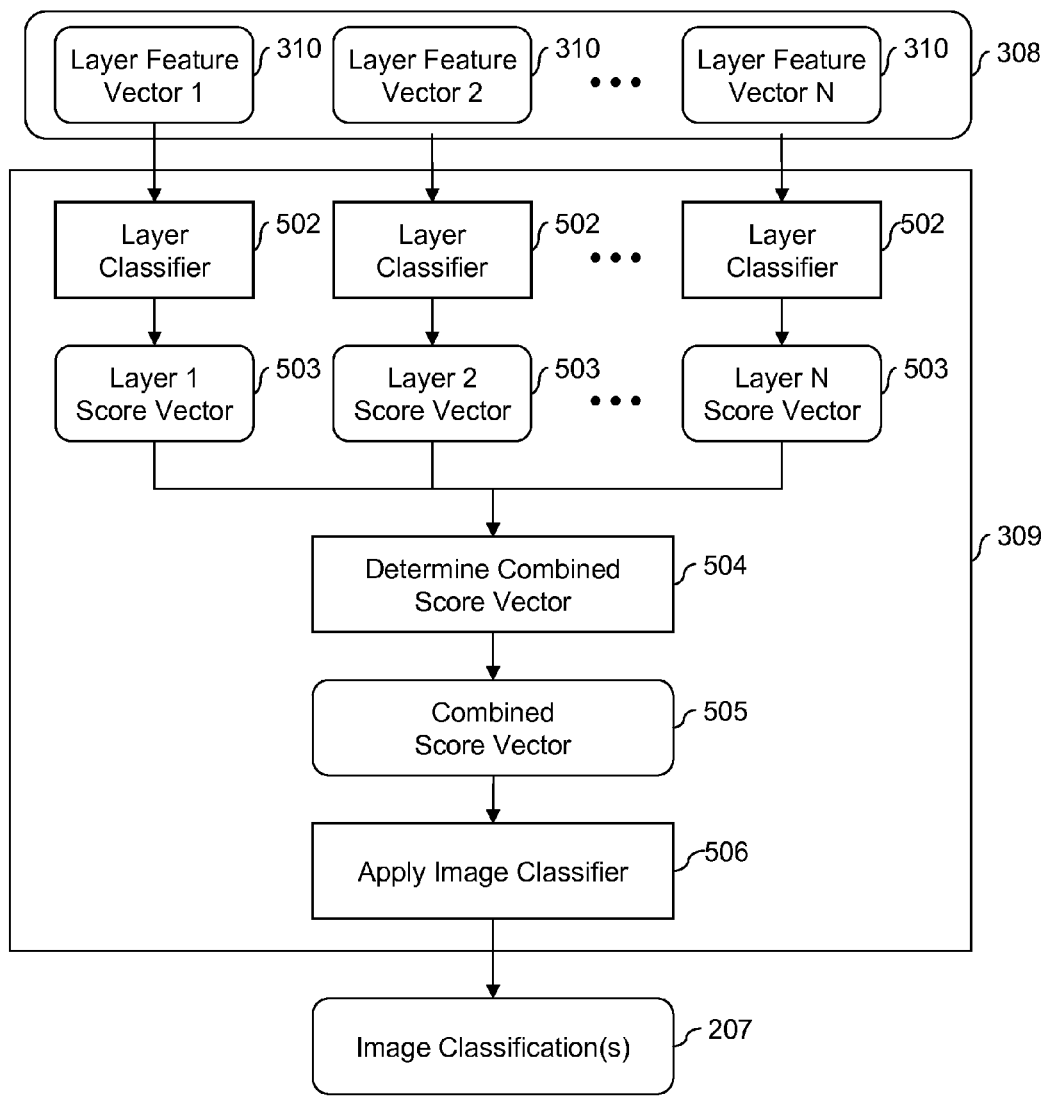
FIG. 5 is a flowchart illustrating additional details for a second embodiment of the identify image classification step shown in FIG. 3.

FIG. 5 is a flowchart illustrating additional details for the identify image classification(s) step 309 in FIG. 3, according to a second embodiment of the present invention. In this variation, individual classifiers are first applied to each distance layer to determine layer scores which are then fed into another classifier. The input to the identify image classification(s) step 309 is a layer feature vector 308, which is comprised of individual layer feature vectors 310 for each of the distance layers 303 (FIG. 3). Each of the individual layer feature vectors 310 is processed using a layer classifier step 502 to form layer score vectors 503. The layer classifier step 502 uses a classifier that has been trained to operate on individual layer feature vectors 310. The layer score vectors 503 are comprised of confidence-rated prediction scores giving a probability for each classification category. The score vectors from each of the distance layers are concatenated to form a combined score vector 505 in determine combined score vector step 504. An apply image classifier step 506 is then used to determine the overall image classification(s) 207 for the digital image 203 (FIG. 3). This image classifier is trained to operate on the combined score vector 505. The classifications produced by this classifier may be the use the same classification categories as the individual layer classifiers, or they may be different classifications.

Figure 6:
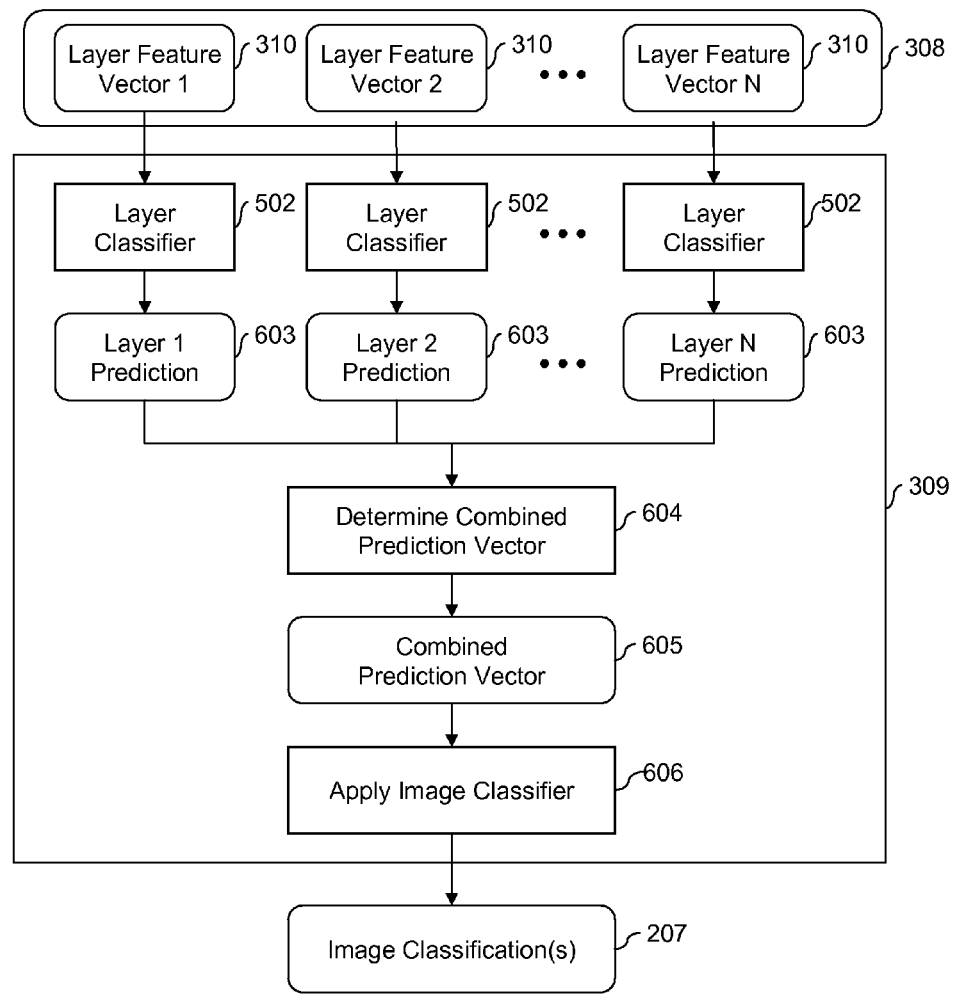
FIG. 6 is a flowchart illustrating additional details for a third embodiment of the identify image classification step shown in FIG. 3.

FIG. 6 is a flowchart illustrating additional details for the identify image classification(s) step 309 in FIG. 3, according to a third embodiment of the present invention. In this variation, individual classifiers are first applied to each distance layer to determine predictions of the most probable classification, which are then fed into another classifier. The input to the identify image classification(s) step 309 is a layer feature vector 308, which is comprised of individual layer feature vectors 310 for each of the distance layers 303 (FIG. 3). As in the method shown in FIG. 5, each of the individual layer feature vectors 310 is processed using a layer classifier step 502. In this case, the output of the layer classifier step 502 is a layer prediction 603, which is an indication of the most probable image classification given the layer feature vector 310 for that particular distance layer. The layer predictions 603 for the individual distance layers are combined to form a combined prediction vector 605 using determine combined prediction vector step 604. An apply image classifier step 606 is then used to determine the overall image classification(s) 207 for the digital image 203 (FIG. 3).

Figure 7:
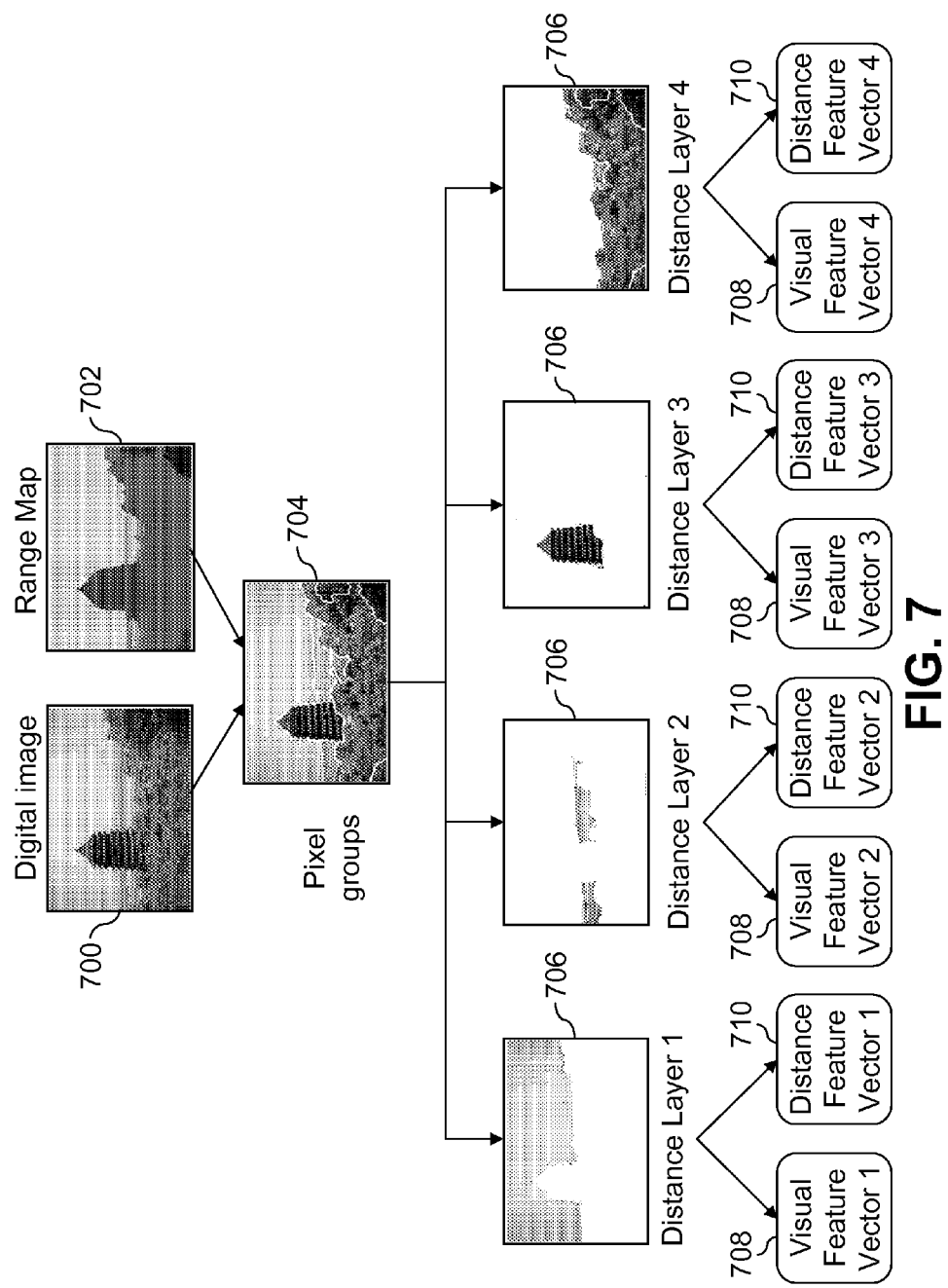
FIG. 7 is a diagram illustrating the process of extracting features from a digital image according to an embodiment of the present invention.

FIG. 7 shows an example illustrating the process of extracting features from a digital image according to the method shown in FIG. 3. The input to this example is a particular digital image 700 and a corresponding range map 702. As part of the firm distance layers step 302 (FIG. 3), the digital image is broken into a set of pixel groups 704. The pixel groups 704 are formed by using a clustering algorithm to group pixels based on their distance from the viewpoint. Each of the pixel groups 704 is assigned to a corresponding distance layer 706. Extract features step 304 (FIG. 3) is then used to determine a visual feature vector 708 and a distance feature vector 710 for each distance layer 706. The visual feature vector 708 and the distance feature vector 710 can then be processed using the remaining steps shown in FIG. 3 that were described above.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 User interface system
140 Data storage system
202 Receive digital image step
203 Digital image
204 Receive range map step
205 Range map
206 Determine image classification(s) step
207 Image classification(s)
208 Associate image with classification(s) step
209 Classified digital image
210 Store in image collection step
211 Image collection
212 Search image collection step
302 Form distance layers step
303 Distance layers
304 Extract features step)
305 Visual feature vectors
306 Distance feature vectors
307 Form layer feature vectors step
308 Layer feature vectors
309 Identify image classification(s)
310 Layer feature vector
402 Generate global feature vector step
403 Global feature vector
404 Apply image classifier step
502 Layer classifier step
503 Layer score vector
504 Determine combined score vector step
505 Combined score vector
506 Apply image classifier step
603 Layer prediction
604 Determine prediction vector step
605 Combined prediction vector
606 Apply image classifier step
700 Digital image
702 Range map
704 Pixel groups
706 Distance layer
708 Visual feature vector
710 Distance feature vector

What is claimed is:

1. A method of identifying an image classification for an input digital image comprised of image pixels, comprising a digital image processor for performing the following:
   a) receiving an input digital image for a captured scene;
   b) receiving a range map which represents range information associated with the input digital image, wherein the range information represents distances between the captured scene and a known reference location;
   c) identifying the image classification using both the range map and the input digital image, wherein step c) includes:
      i) associating a distance from a viewpoint with each image pixel in the input digital image responsive to an analysis of the range map;
      ii) grouping pixels of the input digital image into distance layers responsive to analysis of distances from the viewpoint, wherein each distance layer is a subset of image pixels representing points in the scene where the distance from the viewpoint falls within defined range intervals;
      iii) extracting visual features from each distance layer in the input digital image;
      iv) extracting distance features from each distance layer in the range map;
      v) combining the extracted visual features and the distance features in each distance layer to form layer features; and
      vi) identifying an image classification for the input digital image using the layer features; and
   d) storing the image classification in association with the input digital image in a processor-accessible memory system.

2. The method of claim 1 where in the range intervals are defined by analyzing the range map using a clustering algorithm.

3. The method of claim 1 where in the range intervals are predefined.

4. The method of claim 1 where the distance features from each distance layer are defined as the relative distance from the viewpoint and their values are near, middle or far.

5. The method of claim 1 where in step vi) includes generating a global feature by combining the layer features; and identifying the image classification using the global feature.

6. The method of claim 1 wherein step vi) includes producing a classification score for each distance layer of the image responsive to the layer features; and
   combining all the classification scores to identity the image classification.

7. The method of claim 1 wherein step vi) includes producing an intermediate classification for each distance layer of the image responsive to the layer features; and
   combining the intermediate classifications to identify the image classification.

8. The method of claim 1 wherein the received range map is at a different resolution than the received input digital image and wherein step b) further includes resizing the range map to have the same resolution as the input digital image.

9. The method of claim 1 further comprising:
e) applying steps a) to d) to identify image classifications for a plurality of input digital images forming a collection of classified images;
f) searching the collection of classified digital images based on the stored image classifications.

10. The method of claim 1 wherein the identified image classifications include birthday party, wedding, graduation, tennis games, golfing, beach activities, hiking, theme park visits, shopping, playground activities, or city park activities.

11. The method of claim 1, wherein the range map is received from a ranging camera that senses visible light, inferred light, ultrasound, or laser light.

12. The method of claim 1, wherein the range map is determined by analyzing a stereo image pair.

13. The method of claim 1, wherein the input digital image is captured by a digital camera or a digital scanner.

14. A computer program product stored on a non-transitory computer-readable medium to perform the method in claim 1.

15. A system for identifying image classifications comprising:
a data processing system; and
a memory system communicatively connected to the data processing system and storing instructions configured to cause the data processing system to implement a method for identifying image classifications, wherein the instructions comprise:
receiving an input digital image for a captured scene;
receiving a range map which represents range information associated with the input digital image, wherein the range information represents distances between the captured scene and a known reference location;
identifying the image classification using both the range map and the input digital image; wherein the identifying includes:
i) associating a distance from a viewpoint with each image pixel in the input digital image responsive to an analysis of the range map;
ii) grouping pixels of the input digital image into distance layers responsive to analysis of distances from the viewpoint, wherein each distance layer is a subset of image pixels representing points in the scene where the distance from the viewpoint falls within defined range intervals;
iii) extracting visual features from each distance layer in the input digital image;
iv) extracting distance features from each distance layer in the range map;
v) combining the extracted visual features and the distance features in each distance layer to form layer features; and
vi) identifying an image classification for the input digital image using the layer features; and
storing the image classification in association with the input digital image in a processor-accessible memory system.

* * * * *